Feb. 14, 1950          D. L. HERR          2,497,607
STABLE VERTICAL
Filed Dec. 26, 1946
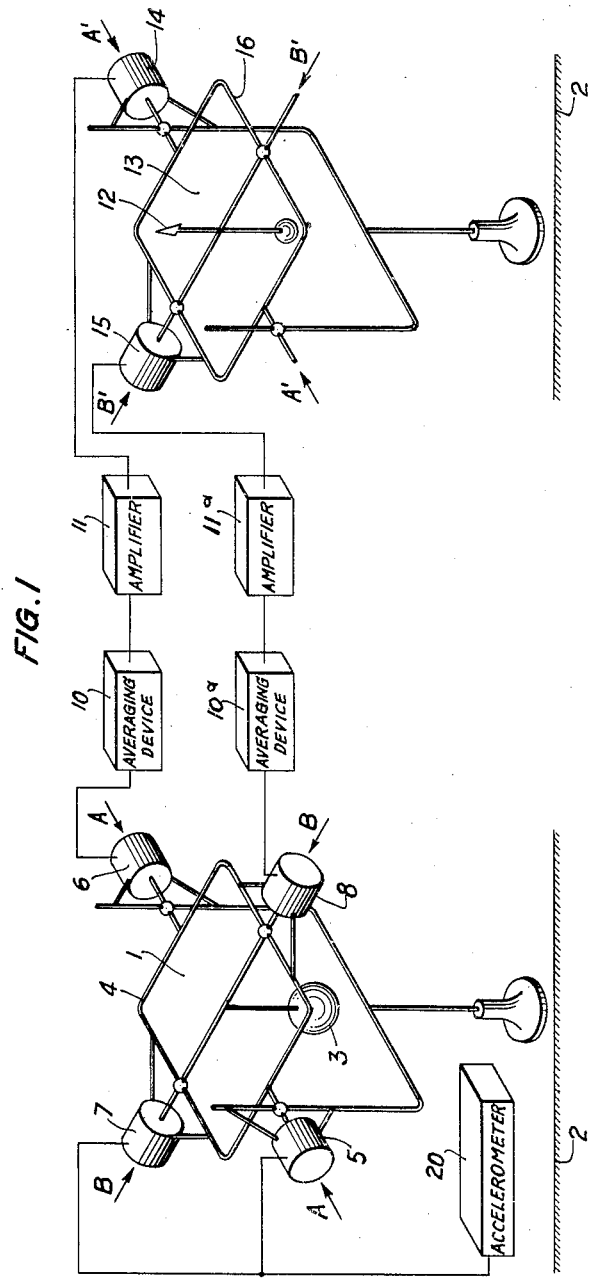
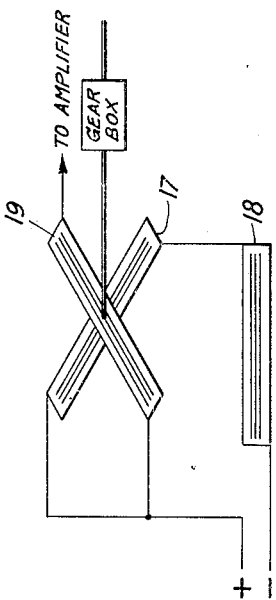
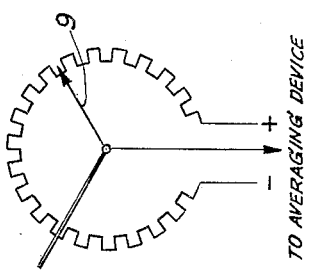
INVENTOR.
Donald L. Herr,
BY
Edward L. Mueller
ATTORNEY.

Patented Feb. 14, 1950

2,497,607

UNITED STATES PATENT OFFICE 2,497,607

STABLE VERTICAL

Donald L. Herr, New York, N. Y., assignor to Control Instrument Company, Inc., Brooklyn, N. Y., a corporation of New York Application December 26, 1946, Serial No. 718,406

5 Claims. (Cl. 33—220)

This invention relates to improvements in a class of instruments frequently called stable verticals which are generally employed to establish and maintain a reference axis while aboard a moving object which axis is substantially perpendicular to the surface of the earth at, above or below which it may be at any given instant, regardless of the fact that the moving object may have motions about its principal axes of linear and/or rotational motion.

Ordinarily this function has been performed by a freely suspended gyroscope, which is made to maintain its spin axis vertical by a variety of controls which control and coerce its precessional movements, and the art is full of exceedingly complex variations all of which are increasingly complex and elegant means for holding a gyro vertical.

The object of this invention is, therefore, to dispense with the gyro and its attendant complex controls, and to substitute therefor a simple and direct means for determining the vertical with even greater precision.

It is a well known fact that a pendulum, unless acted upon by forces other than gravity, will hang in a truly vertical position from its support. If that support should be varying the orientation of its axes with respect to the perpendicular, the pendulum will appear to swing therefrom and may even oscillate, if undamped, about the vertical with a period largely determined by its length.

In accordance with the invention, therefore, the instrument comprises, essentially, a pendulum free to swing without restraint, a frame of reference within which or in respect to which its motions, real or apparent, may be continuously sensed and measured, a means for continuously determining the cause for such motion as observed and of continuously accepting only such motions as are the result of gravitational action, and of continuously rejecting such as are caused by acceleration, a means for continuously averaging the accepted gyrations of the pendulum for a fixed interval of time of adjustable range from that time ago to the present, a means, if necessary, of amplifying the inforation thus obtained to a magnitude sufficiently great to operate continuously an indicator and a means for continuously indicating the average position of the pendulum as heretofore defined, the average continuously representing the true vertical.

The object, and the manner of its accomplishment, will appear more clearly from the description to follow, which, when taken in connection with the drawings show one method of applying the invention herein described; it being expressly understood that the inventive idea herein disclosed is capable of receiving a variety of expressions, and that the said description and drawing are utilized only for the purpose of showing an application of the inventive idea as a whole and not to define the limits thereof, reference being made to the appended claims for this purpose.

In the drawings:

Fig. 1 is a schematic view of a system such as has been proposed;

Fig. 2 is a diagrammatic view of the variable tapped non-inductive resistor utilized; and Fig. 3 is a diagrammatic view of the crossed coil meter and gear box utilized herein.

In Fig. 1 of the drawing, a gimbal 1 is shown, mounted to a "horizontal" member or support 2 with its axes A—A and B—B oriented so that they are parallel to the principal axes of the supporting object. Within the frame of the gimbal 1 and rigidly supported from the B—B axis at a point corresponding to the center of gravity of the system, is a pendulum 3 which, because of the freedom allowed by its mounting, is free to swing in any direction.

The A—A axis of the gimbal about which the pendulum 3, carrying the ring (or frame) 4 rotates, is terminated in a normally open magnetic lock, schematically shown at 5, and a potentiometer, schematically shown at 6 and diagrammatically shown as Fig. 2. In the same way the B—B axis of the gimbal, about which the pendulum 3 rotates, is terminated in a normally open magnetic lock; schematically shown at 7, and a potentiometer, schematically shown at 8 and diagrammatically the same as potentiometer 6, i. e. Fig. 2. Both locks 5 and 7, unless activated as hereinafter shown, are of a nature to permit complete freedom of rotation to their associated shafts. Both potentiometers (Fig. 2) are linear; i. e., a given increment of angular displacement of the shaft gives equal increments of resistance regardless of direction or initial position.

If the pendulum is set in real or apparent motion about its axes, the position of the tap 9 on the potentiometers 6 and 8 as shown in Fig. 2 will be varied.

The potentiometer of Fig. 2, representing 6 and 8 of Fig. 1 is connected to a source of constant voltage—hence carries a constant current; and the I. R. drop from the positive line to the point of position of the variable tap 9, because the potentiometer is linear, is a linear function of the angle through which it is turned. Thus a voltage is obtained having a value proportional to the pendulum position at any instant. If the motion is about the A—A axis, the voltage output of potentiometer 6 will vary; if the motion is about the B—B axis, the voltage output of potentiometer 8 will vary; if the motion is one having components about both axes, components of that motion along the A—A and B—B axes will be converted into voltage fluctuations as described.

For a motion or component of motion of the pendulum about the A—A axis, the varying output of potentiometer 6 is averaged over an arbitrary interval of time longer than the natural period of the pendulum by the conventional averaging device represented schematically at 10, which may be a resistance capacity integrating circuit, or any other averaging means known to the art.

The average thus obtained, if desired, could be interpreted by a d'Arsonval instrument calibrated over a ninety degree scale in 360° of angular deviation; however, it is preferred and shown in this embodiment to amplify the averages thus obtained in a conventional amplifier 11 whose power output is proportional to its voltage input, and to position an indicator 12 to indicate the position of the pendulum referred to the A—A axis.

This is accomplished as follows: a second gimbal 13, oriented so that its A'—A' axis parallels the A—A axis, and its B'—B' axis parallels the B—B axis of gimbal 1, is mounted to a support 2 which is a continuation of or is parallel to the support 2 of gimbal 1, carries an indicating vane 12 on its B'—B' axis and is positioned along the A'—A' axis and B'—B' axis by means of two crossed coil ammeters and gear boxes 14 and 15 which are illustrated diagrammatically in Fig. 3.

The power output of the amplifier is brought to coil 16 of the crossed coil indicator and a fixed current supplied by the fixed voltage source, mentioned but not shown which supplies the potentiometers 6 and 8, supplies its remaining coils 17 and 18. The shaft will tend to position itself over a range of ninety degrees to a point which is a function of the current supplied by the amplifier and hence is a function of the voltage as determined by the pendulum position as hereinbefore described. The gear box converts the angular shaft displacement to one four times as great which displacement is then transmitted to the frame 16, in case of displacement about the A'—A' axis of gimbal 13 to bring the frame to a position corresponding to the average position of the pendulum 3 and frame 4 of gimbal 1 during the averaging interval. For motions or components of motion of the pendulum 3 about the B—B axis, the same procedure is followed, in that the varying output of potentiometer 8 is averaged by the device 10a and amplified by amplifier 11a and by means of the crossed coil indicator and associated gears at 15 used to position the shaft of the gimbal 13 and its indicator vane 12 to the average position of the pendulum 3 and B—B shaft of gimbal 1 during the averaging interval.

In the case when the pendulum is displaced by a linear or angular acceleration, the existence of such accelerations, provided they exceed such minima as are large enough to disturb the accuracy of the system will actuate a conventional accelerometer 19 which will cause the locks 5 and 7 to inhibit any motion of the pendulum during that interval during which said amount of acceleration is present, making the system insensitive to all motion, and designating, for the duration of the acceleration, the last known vertical. Upon cessation of the acceleration, the locks will release the shafts, the pendulum will find the then vertical, and the indicator the new mean position.

From the foregoing, it may be seen that the invention herein discloses a device which, regardless of the motion of the body to which it is attached, continuously indicates true vertical and which is prevented from indicating a pseudovertical upon excessive acceleration of the supporting object.

What is claimed is:

1. In a stable vertical for use on a moving body, the combination of a pendulum freely suspended and capable of unrestrained motion about its point of support, a reference frame associated therewith, means responsive to the instantaneous angular displacements of said pendulum which yield voltages of angular position, means for averaging said voltages thus obtained, an indicator, and means for utilizing the average voltages to position said indicator continuously to the mean position of the pendulum.

2. In a stable vertical for use on a moving body, the combination of pendulous means of short natural period for determining the direction of the forces acting on that body, a frame of reference associated therewith and fixed with respect to said body, means responsive to the instantaneous angular displacements of said pendulous means with respect to said frame of reference for converting the same into representative electrical voltages, means for averaging the magnitude of said voltages over an interval of time longer than the natural period of said pendulous means, and indicating means controlled by and responsive to the average voltage thus obtained to maintain said indicator in a vertical position.

3. In a stable vertical for use on a moving body, the combination of pendulous means for determining the direction of the forces solely due to gravitation, a frame of reference associated therewith and fixed with respect to the body upon which it is employed, means responsive to the instantaneous angular displacements of said pendulous means with respect to said frame of reference for converting said pendulum displacements into equivalent electrical voltages, means for averaging the voltages thus obtained for an interval of time greater than the natural period of said pendulous means, and means for utilizing the averages thus obtained to continuously indicate the mean position of a directional gravitational force with respect to said body.

4. In a stable vertical for use on a moving body, pendulous means freely rotatable about mutually perpendicular axes, potentiometric means responsive to the instantaneous movements of said pendulous means due to any and all forces acting on said pendulous means for converting said forces into equivalent electrical voltages, integrating means coacting with said potentiometric means for averging said equivalent voltages for an interval of time greater than the natural period of said pendulous means, and indicating means coacting with said potentiometric means and said averaging means for indicating the mean position of said pendulous means at any instant.

5. In a stable vertical for use on a moving body, a pendulum of short natural period, a Cardan mount therefor allowing freedom of rotation about mutually perpendicular axes, potentiometric means associated with two of said axes and responsive to the instantaneous angular displacement of said axes due to gravitational effects on said pendulum, integrating means coacting with said potentiometric means, means for averaging the voltage output of said potentiometric means over an interval greater than the natural period of said pendulum, and means utilizing the averages thus obtained to indicate the mean position of said pendulum for that interval over which the average is taken.

DONALD L. HERR.

REFERENCES CITED

The following references are of record in the file of this patent:

UNITED STATES PATENTS

| Number | Name | Date |
|---|---|---|
| 1,924,339 | Weber | Aug. 29, 1933 |
| 2,205,574 | Moross | June 25, 1940 |
| 2,277,027 | West, Jr. | Mar. 24, 1942 |
| 2,414,448 | Carter | Jan. 21, 1947 |
| 2,417,765 | Leonard | Mar. 18, 1947 |
| 2,435,195 | Bomberger et al. | Feb. 3, 1948 |

FOREIGN PATENTS

| Number | Country | Date |
|---|---|---|
| 317,986 | Germany | 1920 |
| 680,945 | France | 1930 |

OTHER REFERENCES

Article in Electronics Magazine, Nov. 1944, entitled "Differentiating and Integrating Circuits," pp. 138–142.

Paper entitled "Theory of Servo Systems . . . Stabilization," pp. 353–367, I. E. E. Journal, vol. 93, No. 34, part II, August 1946.